United States Patent [19]
Neuko

[11] 3,851,663
[45] Dec. 3, 1974

[54] ROTARY COUPLING FOR ROTATING MILKING PARLORS

[75] Inventor: Chester G. Neuko, Jamestown, N. Dak.

[73] Assignee: Circle Milking, Inc., Jamestown, N. Dak.

[22] Filed: July 18, 1973

[21] Appl. No.: 380,154

[52] U.S. Cl............................. 137/580, 119/14.04
[51] Int. Cl............................ F16l 27/08, A01j 5/00
[58] Field of Search.................. 137/580; 119/14.04

[56] References Cited
UNITED STATES PATENTS

| | | | |
|---|---|---|---|
| 2,308,137 | 1/1943 | White | 137/580 |
| 3,261,323 | 7/1966 | Steelhammer | 119/14.04 |
| 3,381,704 | 5/1968 | Richardson | 137/580 X |
| 3,517,694 | 6/1970 | Lieffring | 137/580 X |
| 3,636,975 | 1/1972 | Kirkman et al. | 137/580 |

FOREIGN PATENTS OR APPLICATIONS

| | | | |
|---|---|---|---|
| 1,204,772 | 8/1959 | France | 137/580 |

*Primary Examiner*—William R. Cline
*Attorney, Agent, or Firm*—Dugger, Johnson & Westman

[57] ABSTRACT

A rotary coupling for use in a milking parlor wherein the rotary coupling permits the carrying of fluids, and electricity, from stationary members to rotating members. The rotary coupling is used primarily with rotating milking parlors wherein the milking operation is performed as the cows move on a rotating platform. The rotary coupling permits the carrying of necessary power for the milking operation, and the return of milk from the rotating platform to the stationary milk building.

2 Claims, 3 Drawing Figures

ROTARY COUPLING FOR ROTATING MILKING PARLORS

BACKGROUND OF THE INVENTION

1. Field of the Invention

The present invention relates to rotary couplings for carrying fluids and power from the stationary building or member to a rotating member in a milking parlor.

2. Prior Art

In U.S. Pat. No. 3,261,323 issued July 19, 1966 to P. M. Steelhammer, a rotating coupling is shown which comprises two plates that are substantially parallel, and are connected so that they will rotate relative to each other. In this particular instance, sealing of the plates is somewhat of a problem, and the plates become large if several connections are made in the course of the plate.

The plates mate across quite large surfaces, and it is difficult to keep a tight seal between the surfaces of the plates.

SUMMARY OF THE INVENTION

The present invention relates to a rotating coupling which comprises concentrically mounted members, one of which rotates with respect to the other about an upright axis, and wherein the sealing of the passageways for carrying the power or fluid, such as vacuum for running milking machines, air under pressure, or water, is done around substantially cylindrical surfaces so that ordinary O-rings can be used for the sealing members.

In the form shown, an outer ring is positioned around a center rotating housing, and the center housing has an outer cylindrical surface against which O-rings mounted on the outer ring seal. The outer ring has an annular groove opening to the inner surface for each of the fluids to be carried. The connections comprise pipes connected to the sources of fluid and to radial passageways in the stationary member and open to one of the annular passageways. The O-rings are used to form seals on opposite sides of the annular grooves to keep the grooves sealed positively with respect to the rotating inner member. The inner member has connecting passageways aligning with and communicating with the respective annular grooves. Pipes lead from the connecting passageways to connections on the rotating milking platform.

The electrical connections likewise are mounted about a vertical axis, and this permits the stacking of a plurality of slip rings and brushes in vertical direction to have adequate capacity for a number of different control circuits, or for a number of different power circuits without greatly increasing the size of the unit.

In each instance, where a fluid is carried between the rotating coupling members, a passageway for connection includes an annular groove mating with the rotating member and O-ring seals around the cylindrical surfaces of the members.

DESCRIPTION OF THE PREFERRED EMBODIMENT

Figure 1:
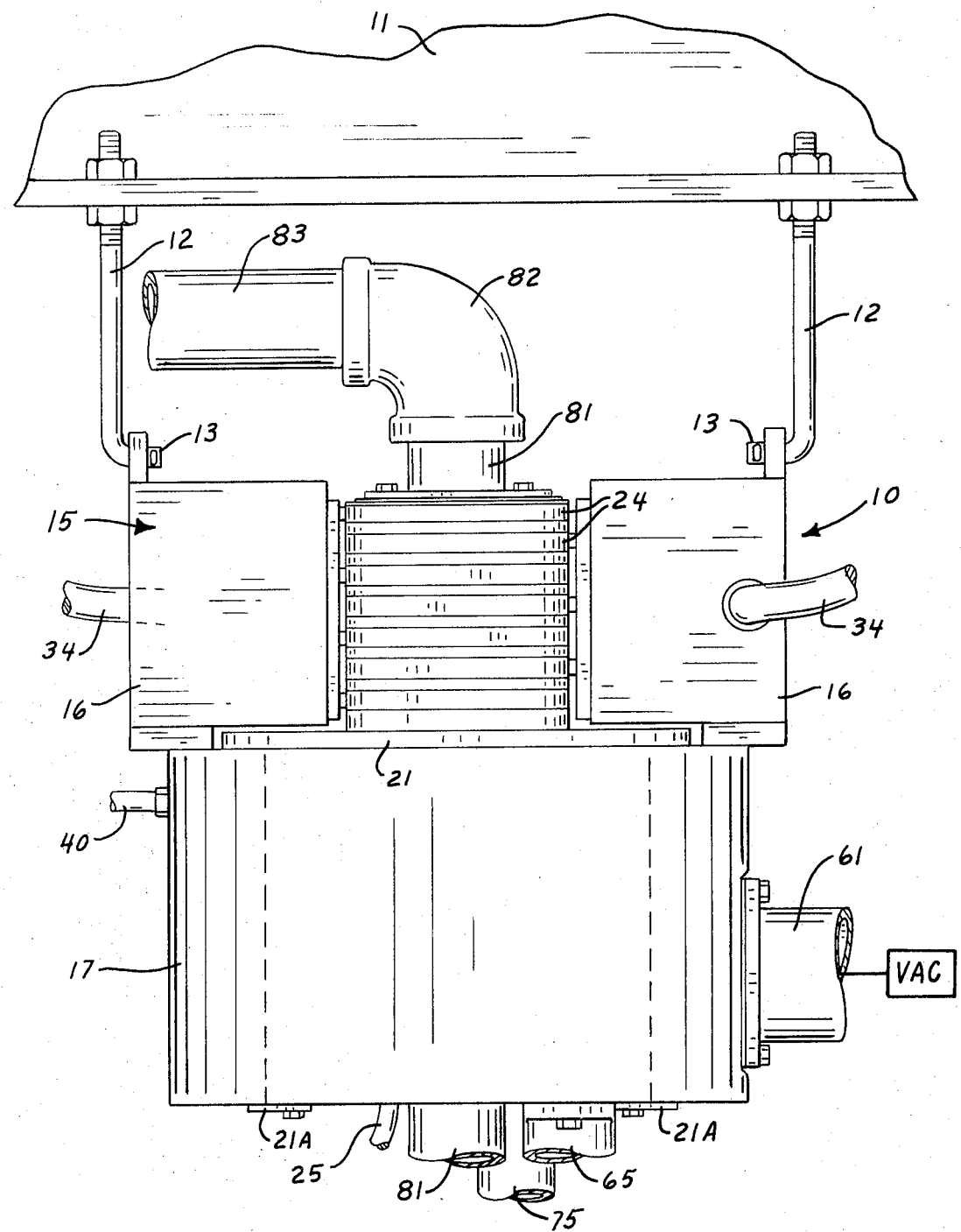
FIG. 1 is a side elevational view of a rotary coupling made according to the present invention and shown installed on a beam in a milking parlor.

A rotary coupling for rotating milking parlors shown generally at 10 is shown supported on a suitable beam 11 which would extend across the top of the milking parlor, and which would not rotate with respect to the parlor. The beam 11 includes support brackets 12, 12 that are supported thereon, and which have end portions 13, 13 that are fitted into brackets 14 on the rotary coupling. Brackets 14 thus are held stationary by the end members 13, and the stationary housing member of the rotary coupling illustrated generally at 15, is also held from rotation.

The housing member 15 includes a pair of electrical connector boxes 16, 16 the upper portions thereof, and a lower cylindrical sleeve 17. The boxes 16, 16 and the sleeve 17 are fastened together so that they remain stationary, and the boxes support the sleeve 17.

In the use of milking system it is necessary to have water, air pressure, and vacuum sources for running the milking machines and other equipment. In additon, there must be a passage or opening for the milk pipe carrying the milk from the cows into a stationary storage and cooling tank to pass through the coupling. Rotary joints or couplings on milk pipes are well known, so the rotary coupling of the present invention only has to provide a passageway for such a pipe to extend therethrough. In additon, there are various electrical needs on the rotating parlor and so the electricity must be carried through a slip ring assembly.

Figure 2:
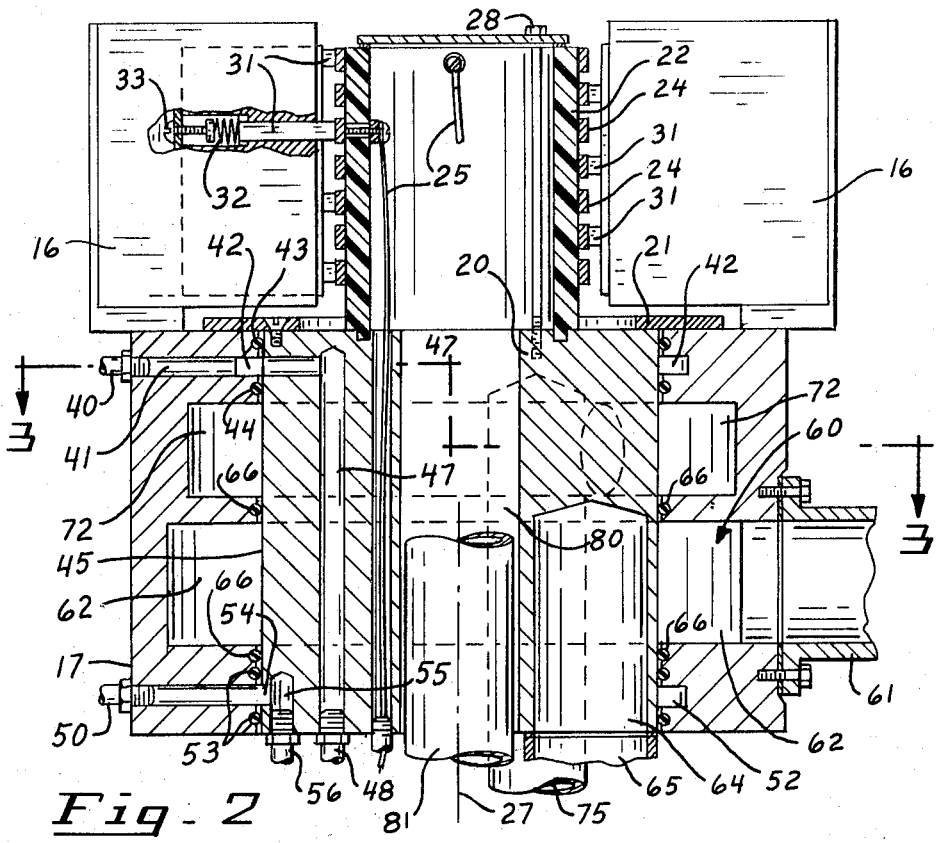
FIG. 2 is a vertical sectional view of the device of FIG. 1 showing the interior components in detail.

The sleeve 17 surrounds a central housing member or hub 20 which rotates with the milking parlor, and is rotatably mounted with respect to the sleeve 17. Referring to FIG. 2, it can be seen that the hub 20 carries a support ring 21 that extends radially like a shoulder to engage the upper surface of the sleeve 17. The ring 21 is positioned below the boxes 16 for electrical connections. This ring 21 can be made of a Teflon material or other suitable bearing material so that the weight of the inner hub is carried through the ring 21 to the sleeve 17, and through the brackets 14 to the beam 11. Small tabs or washers 21A can be attached to the hub 20 on the lower side to prevent the hub 20 from moving upwardly relative to the sleeve 17.

Figure 3:
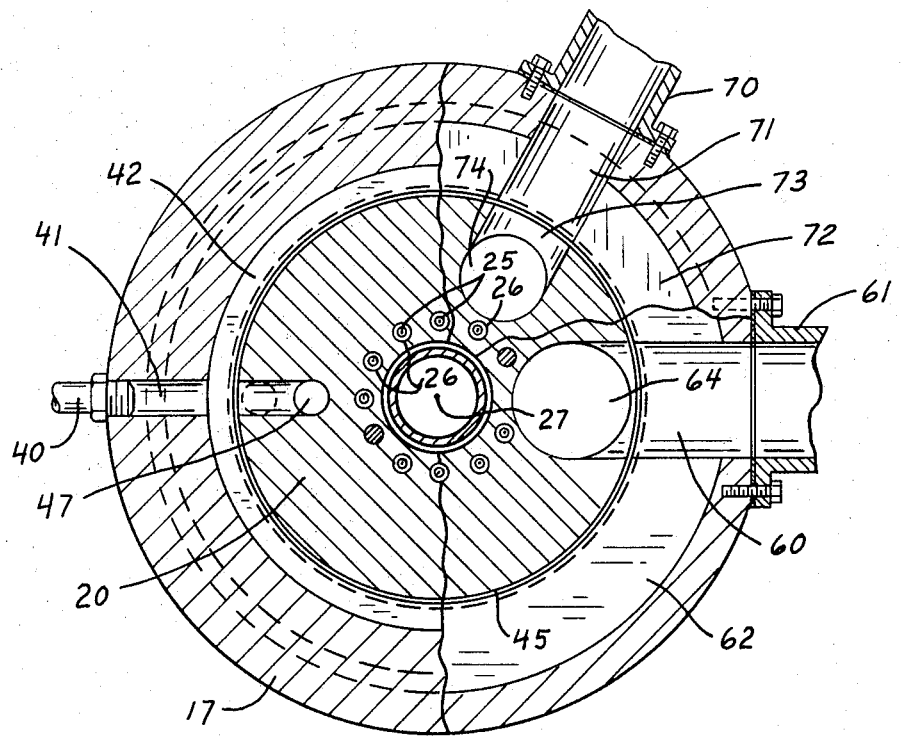
FIG. 3 is a sectional view taken as on line 3—3 in FIG. 2, wih additional portions broken away to disclose details.

The hub 20 has and insulated tube 22 mounted at the top portions thereof with suitable cap screws 23 that clamp the tube 22 down onto the hub 20. The tube 22 is encircled by a plurality of separated annular electrical conducting slip rings 24 which extend around the periphery of the tube. Each of the rings 24 is connected to a separate electrical wire 25 of suitable size. The connection can be made in any suitable way such as with a terminal screw or other desired terminal that extends through the tube 22 to engage the particular ring 24 that is being connected to the wire 25. The wires 25 each pass through an individual opening or passageway 26 (see FIG. 3) which extend parallel to the central rotational axis 27 of the hub 20. The openings 26 can be positioned in any desired location, and provide protection for the electrical wires that are used on the rotating milking parlor. Each of the boxes 16 in turn mounts a brush block assembly 30 that can be of any usual design, and includes a suitable mounting to hold the block in place, and a plurality of individual electrical conducting brushes 31 are slidably mounted along their axial length in the brush block assembly and held against the aligning slip ring by springs 32 and connecting screws 33 that in turn are attached to individual wires coming from a suitable electrical conduit 34 that enters each of the boxes 16.

The brushes on one brush block engage every other slip ring and the brushes on the opposite brush block engage the alternate rings. Thus, for example, the top slip ring is engaged by brushes on the left brush block (FIG. 2) and the second from the top slip ring is engaged by brushes in the right hand brush block. This provides more space and equalizes the load on tube 22. The vertical spacing of the slip rings permits stacking of a large number of rings in a small space so that enough connections are provided for all power and control circuits needed.

Also, each brush block can carry two brushes for each ring so there is double contact area. The stationary cables 34 can be plugged into suitable receptacles or to other terminal boxes or areas and can carry the necessary electrical power or electrical signals from the stational house or building in which the rotary milking parlor is mounted to the rotating milking platform through the brush block assembly comprising the brushes 31 acting on corresponding slip rings 24.

The outer sleeve, comprising a housing member 17, as shown, has an inner annular surface that surrounds the hub 20. In order to carry necessary fluid power, such as vacuum, or air to the rotating platform, suitable lines are connected to the stationary sleeve 17, and then a mating connection is made to the inner hub 20. As shown, an air line from a suitable compressor or air source is indicated at 40 and this is threaded into a suitable connection leading to a radial passageway 41 in the sleeve 17. The passageway 41 extends radially outwardly from the inner surface of the sleeve 17, and as shown, this passageway 41 opens to an annular passageway 42 in the sleeve 17. The passageway 42 is the same axial height as the passageway 41. These passageways can be seen in both FIGS. 2 and 3. The annular passageway 42 extends all the way around the inner surface of the sleeve 17 so that the passageway 42 forms an annular groove opening against the outer surface of the hub 20.

A pair of axially spaced O-rings 43 and 44 are mounted in provided grooves in the inner surface of the sleeve 17, and these O-rings are compressed to sealingly engage the outer surface 45 of the hub 20 to seal the edges of the annular groove 42. A radial passageway 46 in hub 20 opens in alignment with groove 42, and in turn passageway 46 communicates with an axial passageway 47 in hub 20 that is connected to a line 48 that can be used on the rotating milking platform. The line 48 rotates with the hub 20 and milking platform. The passageway 46 will continuously be in communication with the annular groove 42 as hub 20 rotates. This means that air entering passageway 41 will also be carried in passageway 42 and will be carried to the passageways 46 and 47 and thus to line or pipe 48 as the hub 20 rotates.

Likewise, a water line indicated generally at 50 can be connected to a radial passageway 51 in sleeve 17, and radial passageway 51 communicates with an annular passageway 52 in the sleeve 17, that is sealed at its edges with O-rings 53, 53 on opposite sides thereof.

The passageway 52 aligns in direction of the rotational axis 27, with a short radial passageway 54 in the hub 20, and the passageway 54 also communicates with a short axially extending passageway 55. The passageway 55 is connected to a water line 56 that rotates with the rotating milking parlor so that water can be carried across the junction between passageways 52 and 53 from the stationary line 50 to the rotating line 56.

In the operation of milking parlors, it is sometimes desired to provide at least two vacuum lines for running the milking machines, or for other functions, and these lines can be of different capacity for different purposes. As shown, sleeve 17 is provided with a large radial passageway 60 that is coupled to a vacuum line 61 that leads from a vacuum source on the stationary side of the unit. The line 61 is sealed to the sleeve 17 in a suitable manner, such as with a flange and gasket. Radial passageway 60 communicates with an annular passageway 62 defined in the sleeve 17, and this passageway 62 aligns with a short radial passageway 63 in the hub 20 which leads to another axial passageway 64 of suitable size. A pipe 65 that rotates with the hub 20 and carries vacuum to the rotating milking platform is connected to the passageway 64 in any suitable manner. The pipe 65 extends axially downwardly from the hub 20. Suitable O-rings 66 are provided on opposite sides of the passageway 62 to insure that the vacuum carried will be sealed off from the other passageway, and the O-rings again are in grooves in the inner surface of the sleeve 17 and seal against the outer surface 45 of the hub 20.

A different size vacuum line can also be used with the rotary coupling of the present invention, and as shown a stationary pipe 70 (see FIG. 3) is connected to a radially extending passageway 71 on the stationary sleeve 17, and this passageway 71 communicates with an annular passageway 72 in the sleeve 17. Annular passageway 72 aligns with a short radial passageway 73 in the hub 20. The passageway 73 is connected to an axially extending passageway 74 that leads out through the bottom of the hub. A pipe 75 is sealingly connected to the passageway 74, in any suitable manner, and thus rotates with the hub 20 to carry vacuum to the rotating milking platform.

One of the O-rings 66 positioned between the passageway 62 and 72 seals one side of the passageway 72, and one of the O-rings 44 for the annular passageway 42 also seals the other side, so the passageway 72 is sealed in this manner by O-rings that have double duty.

The hub 20 and the tube 22 together define a central opening 80 that extends axially along the axis 27, and this opening 80 is used for providing passage of a pipe 81 that carries milk from the milking machines on the rotating milking platform to a stationary milk storage tank. The pipe 81 can have a suitable elbow on it as shown to lead to the appropriate location.

Rotary couplings for milk pipes are quite well known in the art, and one is shown in the U.S. Pat. No. 3,261,323. However, it should be noted that the rotary coupling of the present invention includes connections for four different elements, namely two vacuum pipes, water, and air under pressure, in the lower portions of the housing, as well as carrying electrical connections with as many slip rings as necessary in the upper portions of the housing. By having concentrically mounted members, the axial length of the rotary coupling can be increased to accomodate as many different connections as is necessary to carry out the functions to be used. For example, if more electrical lines are needed, the tube 22 need only be expanded in axial length, and additional brushes and slip rings added to the combination. With an increased axial length of hub 20 and sleeve 17 additional annular passageways can be added to carry additional lines for fluid coupling such as a liquid or a gas, across the mating surface of the rotary joint.

Thus by using two concentric members, one of which rotates and the other which is stationary, the invention has utility. In addition, the sealing of the present invention is quite easy to do because cylindrical surfaces are used for O-ring sealing. Such surfaces are easily machined or milled, and there is no need for sealing flat surfaces, as is necessary with many of the plate type rotary couplings.

In the connection with the fluid sources there is an annular passageway on one housing member aligning with a radial passageway on the other member, and a separate axial passageway opening to each radial passageways, which extend along the axis of the rotary member and opens to an outer surface to which the rotating pipe or pipe is connected. Thus the sealing joint or connection between the stationary and the rotating members mate with an annular passageway in the other. This insures ease of sealing, ease of manufacturing, and reliable operation.

What is claimed is:

1. A rotary coupling for rotating milking parlors for carrying fluids and electric power from a stationary portion of the parlor to the rotating portion of the parlor, comprising a stationary member, a rotating member rotatably mounted with respect to said stationary member for rotation about a substantially central axis, means to support said rotary coupling with said central axis extending substantially vertically, said stationary and rotating members being concentrically mounted about said central axis, said stationary member comprising a housing defining a central opening and including a first section encompassing said rotating member and having a plurality of axially spaced, annular recesses defined therein, a plurality of conduits connected to said housing on the exterior of said first section, each conduit being open to one of said annular recesses, said conduits including at least one vacuum carrying conduit, and other conduits carrying fluid under pressure, separate passageways in said rotating member each aligning with one of said annular recesses in said first section of said stationary member, and said separate passageways in said rotating member including portions having axes substantially parallel to said central axis, means to couple said passageways in said rotating member to remote lines rotating with said rotating member, said rotating member having a central passageway extending completely through said rotating member, said coupling including a second portion for transmitting electrical power including electric annular slip rings on said rotating member and stationary brush means mounted on said housing, said annular slip rings and said brush means being postioned vertically above said first section of said housing carrying said annular recesses and said conduits, and seal means between each of the individual annular passageways in said stationary member and corresponding portions of said rotating member and passageway means in said rotating member for carrying electrical wires to said slip rings, said central passageway through said rotating member being a nonsealed passageway of size to permit a separate conduit to pass therethrough.

2. The combination as specified in claim 1 and a separate conduit sealed from said central passageway and passing through said central passageway.

* * * * *